(12) United States Patent
Jensen

(10) Patent No.: US 10,684,372 B2
(45) Date of Patent: Jun. 16, 2020

(54) SYSTEMS, DEVICES, AND METHODS FOR AUTONOMOUS VEHICLE LOCALIZATION

(71) Applicant: UATC, LLC, San Francisco, CA (US)

(72) Inventor: Kenneth James Jensen, Alameda, CA (US)

(73) Assignee: UATC, LLC, San Francisco, CA (US)

( * ) Notice: Subject to any disclaimer, the term of this patent is extended or adjusted under 35 U.S.C. 154(b) by 222 days.

(21) Appl. No.: 15/853,448

(22) Filed: Dec. 22, 2017

(65) Prior Publication Data

US 2019/0101649 A1 Apr. 4, 2019

Related U.S. Application Data

(60) Provisional application No. 62/567,439, filed on Oct. 3, 2017.

(51) Int. Cl.
*G05D 1/02* (2020.01)
*G05D 1/00* (2006.01)
(Continued)

(52) U.S. Cl.
CPC .............. *G01S 17/89* (2013.01); *G01C 21/30* (2013.01); *G01S 7/4808* (2013.01); *G01S 7/497* (2013.01);
(Continued)

(58) Field of Classification Search
None
See application file for complete search history.

(56) References Cited

U.S. PATENT DOCUMENTS

| 9,916,763 B2 * | 3/2018 | Jenkins | G08G 5/0069 |
| 9,977,983 B2 * | 5/2018 | Kochi | G01B 11/00 |

(Continued)

FOREIGN PATENT DOCUMENTS

| CN | 106052697 | 10/2016 |
| WO | 2017155970 | 9/2017 |
| WO | 2019070824 | 4/2019 |

OTHER PUBLICATIONS

"International Application Serial No. PCT US2018 054124, International Search Report dated Aug. 1, 2019", 5 pgs.

(Continued)

*Primary Examiner* — Adam D Tissot
(74) *Attorney, Agent, or Firm* — Schwegman Lundberg & Woessner, P.A.

(57) ABSTRACT

Disclosed are systems, methods, and computer-readable storage media to control a vehicle. In one aspect, a method includes capturing point-cloud data representative of a surrounding of an autonomous vehicle with one or more LIDAR sensors, identifying a point in the point cloud data as a non-matching point in response to the point having no corresponding point in a map used to determine a position of the autonomous vehicle, determining whether the non-matching point is to be used in a determination of an overlap score based on one or more comparisons of the point cloud data and the map, determining the overlap score in response to the determining whether the non-matching point is to be used in the determination of the overlap score, determining a position of the autonomous vehicle based on the overlap score and the map, and controlling the autonomous vehicle based on the position.

19 Claims, 11 Drawing Sheets

(51) Int. Cl.
*G01S 17/89* (2020.01)
*G01S 17/46* (2006.01)
*G01S 7/497* (2006.01)
*G01S 17/06* (2006.01)
*G01S 7/48* (2006.01)
*G01C 21/30* (2006.01)

(52) U.S. Cl.
CPC .............. G01S 17/06 (2013.01); G01S 17/46 (2013.01); G05D 1/0088 (2013.01); G05D 1/024 (2013.01); G05D 1/0248 (2013.01); G05D 1/0268 (2013.01); G05D 1/0274 (2013.01); *G05D 2201/0213* (2013.01)

(56) References Cited

U.S. PATENT DOCUMENTS 10,078,335 B2 * 9/2018 Mei .................. G05D 1/024
2008/0075326 A1 * 3/2008 Otani .................. G01C 3/00
382/106

OTHER PUBLICATIONS

"International Application Serial No. PCT US2018 054124, Written Opinion dated Aug. 1, 2019", 6 pgs.
David, Doria, "Consistency and confidence : A dual metric for verifying 3D object detections in multiple LiDAR scans", 2009 IEEE 12th International Conference on Computer Vision Workshops, ICCV Workshops : Kyoto Japan Sep. 27 Oct. 2009 Institute of Electrical and Electrical and Electronics Engineers Piscataway, (Sep. 27-Oct. 4, 2009), 1481-1488.

* cited by examiner

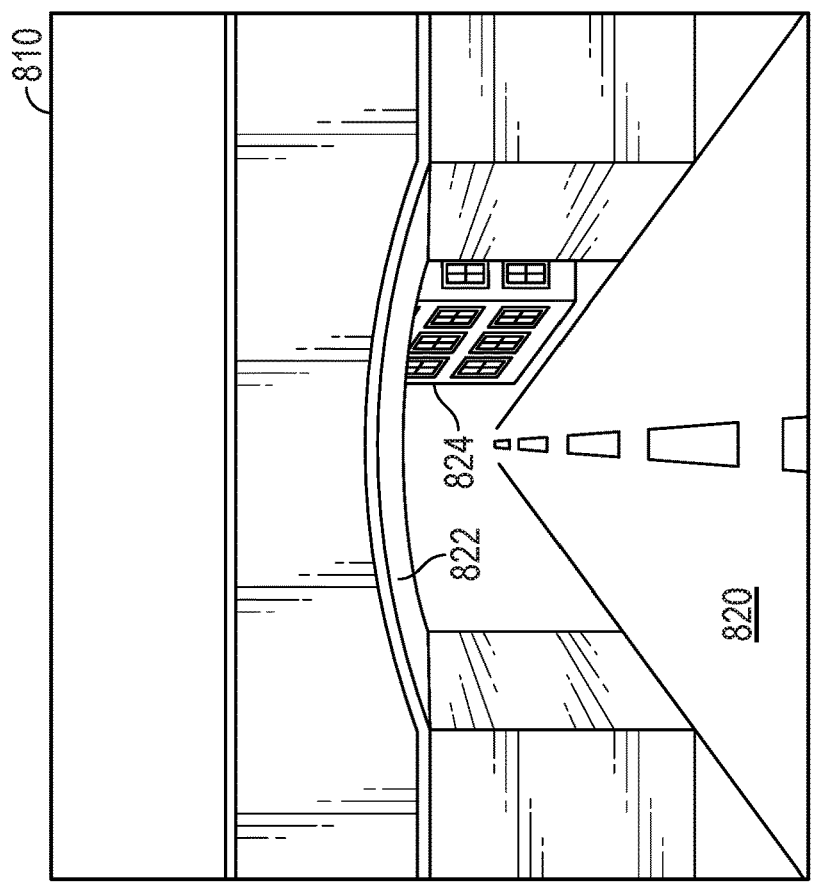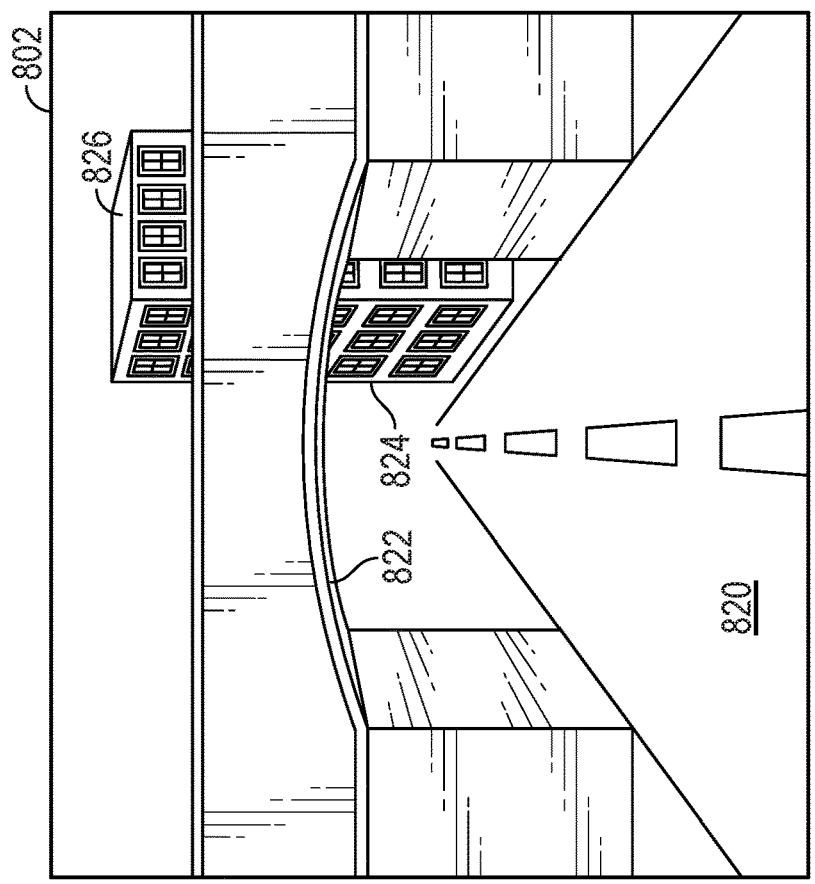
FIG. 8

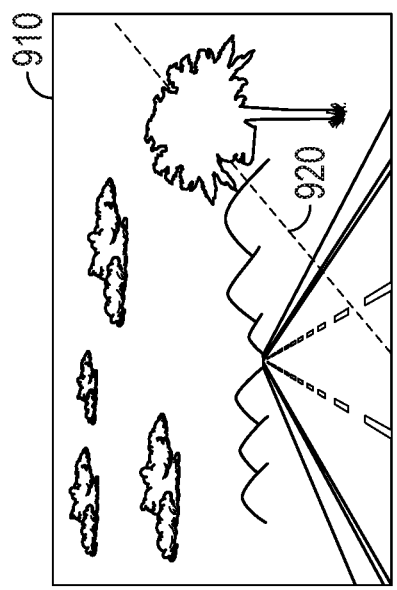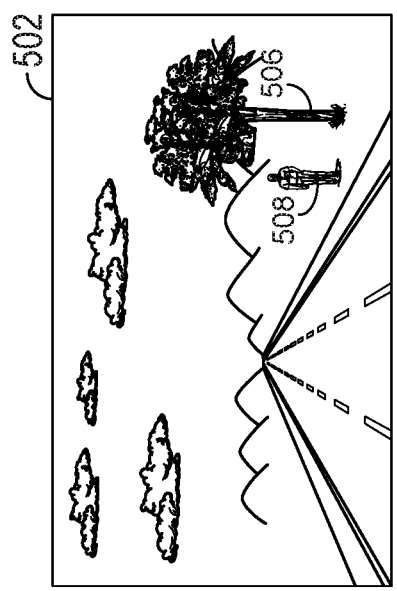
FIG. 9

SYSTEMS, DEVICES, AND METHODS FOR AUTONOMOUS VEHICLE LOCALIZATION

CROSS REFERENCE TO RELATED APPLICATIONS

This application claims priority to U.S. Provisional Application No. 62/567,439, filed Oct. 3, 2017 and entitled "SYSTEMS, DEVICES, AND METHODS FOR IMPROVED AUTONOMOUS VEHICLE CONTROL." The content of this prior application is considered part of this application, and is hereby incorporated by reference in its entirety.

TECHNICAL FIELD

The present disclosure generally relates to the control of autonomous vehicles, and in particular to improving an ability to correlate location information in a map with location data obtained by a vehicle while in motion.

BACKGROUND

Control of autonomous vehicles may rely on comparisons between maps of a local area and information acquired by on-board vehicle sensors. These sensors may rely, in various aspects, on one or more of optical, radio, and laser based technologies. The comparisons between the maps and the data obtained by the vehicle sensors may enable to vehicle to identify its position along a roadway, in real time, and make adjustments to its position and/or speed based on the identified position.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 8 shows example two dimensional representations of point cloud data used to determine an overlap score.

FIG. 9 illustrates tracing of a ray from a laser source to a destination.

DETAILED DESCRIPTION

Figure 1:
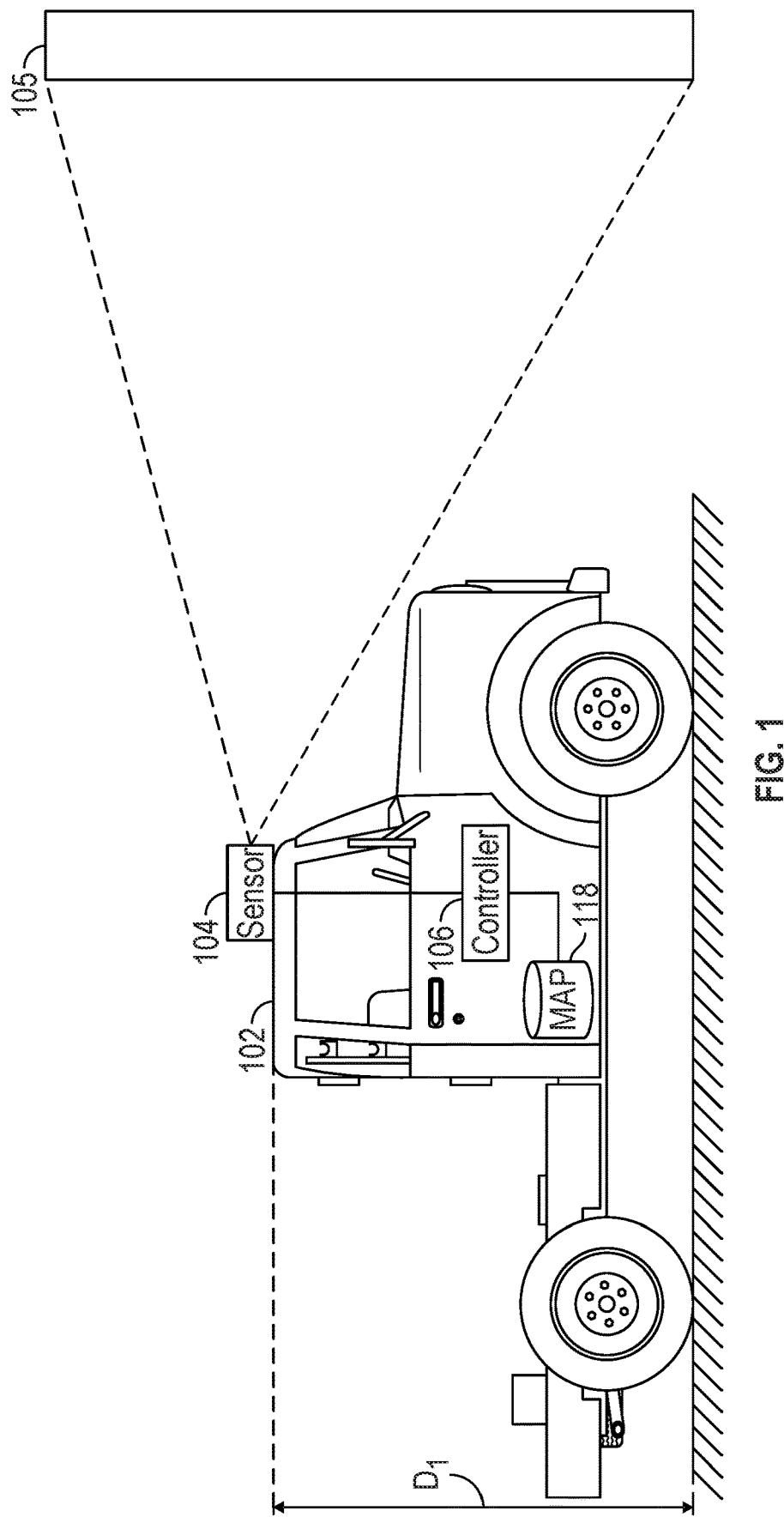
FIG. 1 is an overview diagram of an autonomous vehicle

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Maps of an autonomous system can be used to perceive the environment, detect objects, localize and control of autonomous vehicles. One type of map is a map that provides coordinates of certain map features, such as roads, addresses, points of interests, traffic information, and the like. Such maps, sometimes referred to as coverage maps, can be used to generate routing information from point A to point B. However, the maps of an autonomous system for the function listed above may require higher fidelity representation of the world. For example, a map for autonomous vehicles ("AV Map") may include a 3-D point cloud of the environment. As will be described below, such AV maps can be generated by driving a mapping vehicle equipped with a sensor within an area being mapped. The mapping vehicle may drive a section of road a number of times to generate a dense set of map data for the section of road. In this way, the map data represents the world from the perspective of the sensor on the mapping vehicle. The map data can include geolocation metadata so that the autonomous vehicle can determine the sensor data that is expected at a given location.

Maps may be generated from data collected in a variety of environments. For example, some maps are generated based on data collected from vehicles having roof mounted sensors, e.g., a LIDAR (Light Detection and Ranging), RADAR (Radio Detection and Ranging), or Visual sensors (e.g., a camera sensor). Other maps are generated from data collected by vehicles with sensors mounted on an extension platform. The extension platform may position the sensor substantially above the vehicle's roof line. Furthermore, while the data collected for maps may vary, vehicles using the maps for autonomous position determination may also have sensors that vary in their positions. For example, a small compact car may have an LIDAR sensor located at a first distance from the ground while a large semi-tractor may have an LIDAR sensor positioned at a larger second distance. Thus, a sensor mounted to the top of a compact car and to the top of a truck may generate different point clouds because of the different perspectives.

Additionally, the angle of a sensor used to collect map data may also vary from map to map. For example, some vehicles may be positioned in a slightly nose up attitude, resulting in the sensor being slightly inclined with respect to the horizontal. Other map generating vehicles may have a nose down stance, resulting in the sensor line of sight falling slightly below the horizontal.

The disclosed methods, devices, and systems provide for improvements in autonomous vehicles in a variety of environments, such as those described above. In some aspects disclosed, an autonomous vehicle generates an overlap score. The overlap score provides an indication of how well position information derived from three-dimensional LIDAR point cloud captured by autonomous vehicle matches position information (e.g. point cloud data) included in a particular map at a particular location and, in some embodiments, orientation. The autonomous vehicle generates multiple overlap scores from a single set of captured position information by calculating the overlap score at different candidate positions within the particular map. Each overlap score provides an indication of how likely the corresponding candidate position corresponds to the vehicle's true position within the map data. A candidate location corresponding to map data having the best overlap score may be considered the best approximation of the vehicle's position in some aspects.

As discussed above, in some embodiments, an autonomous vehicle's sensor that is collecting the position information is configured differently (e.g., different heights from the ground) than a sensor that captured the map data. This difference may result in a reduced overlap score when data derived from the two sensors is compared because, for example, the perspective of the vehicle's sensor is different from the perspective of the sensor that was used to generate the map. At a given location, different perspectives can cause certain objects or map features to be occluded or not occluded. In some cases, the reduction in overlap score, even for the overlap score at a location within the map that corresponds to the vehicle's true location, may result in the autonomous vehicle failing to recognize its current position from the map data. This may cause the vehicle to provide a warning, to exit from autonomous driving, or to rely on less accurate means of estimating its position.

To improve the determination of overlap between vehicle's captured sensor data ("vehicle data") and map data, the disclosed methods, devices, and systems may detect differences between the vehicle data and map data that can be explained by differences in positions of the respective sensors used to collect the data. For example, in some aspects, if a point in the vehicle data does not have a match in the map data, a ray may be traced from the vehicle's sensor position through the non-matching point in the vehicle data. If the traced ray intersects a point in the map data, the non-matching point may be included in the overlap score determination. Otherwise it may not be included. For example, in some aspects, an overlap score is a ratio of a number of points in the vehicle data that match points in the map data, to a total number of points in the vehicle data. If the non-matching point is not included in the overlap score, the total number of points does not include the non-matching point.

Some aspects may determine points within the map data that are occluded. For example, these points may not have been visible to a sensor used to collect the map data. If a non-matching point in the vehicle data falls within an occluded portion of the map data, the non-matching point may not be included in the overlap score determination. Otherwise, the non-matching point may be included in the overlap score determination. Use of the above techniques may improve an overlap score's representation of how well the vehicle data matches the map data.

FIG. 1 is an overview diagram of an autonomous driving truck. The vehicle 102 includes a sensor 104, a controller or vehicle computing system 106, and a map database 118. The sensor 104 captures point cloud data representing a scene 105. In the illustrated embodiment, the sensor 104 is positioned on the roof of the truck, resulting in a distance of $D_1$ between the ground and the sensor 104. The sensor 104 may be a LIDAR sensor. In some other aspects, the sensor 104 may be a visual sensor or an infrared sensor. The sensor 104 may be comprised of multiple physical sensors or multiple physical sensor devices. The sensor 104 may provide three-dimensional data. For example, data in an X, Y, and Z dimension may be obtained from the sensor 104.

The controller or vehicle computing system 106 compares data collected by the sensor 104 to map data included in the map database 118. As discussed above, the controller or vehicle computing system 106 computes an overlap score between the data collected by the sensor 104 and the map data in the map database 118 to determine a position of the vehicle 102.

Figure 2:
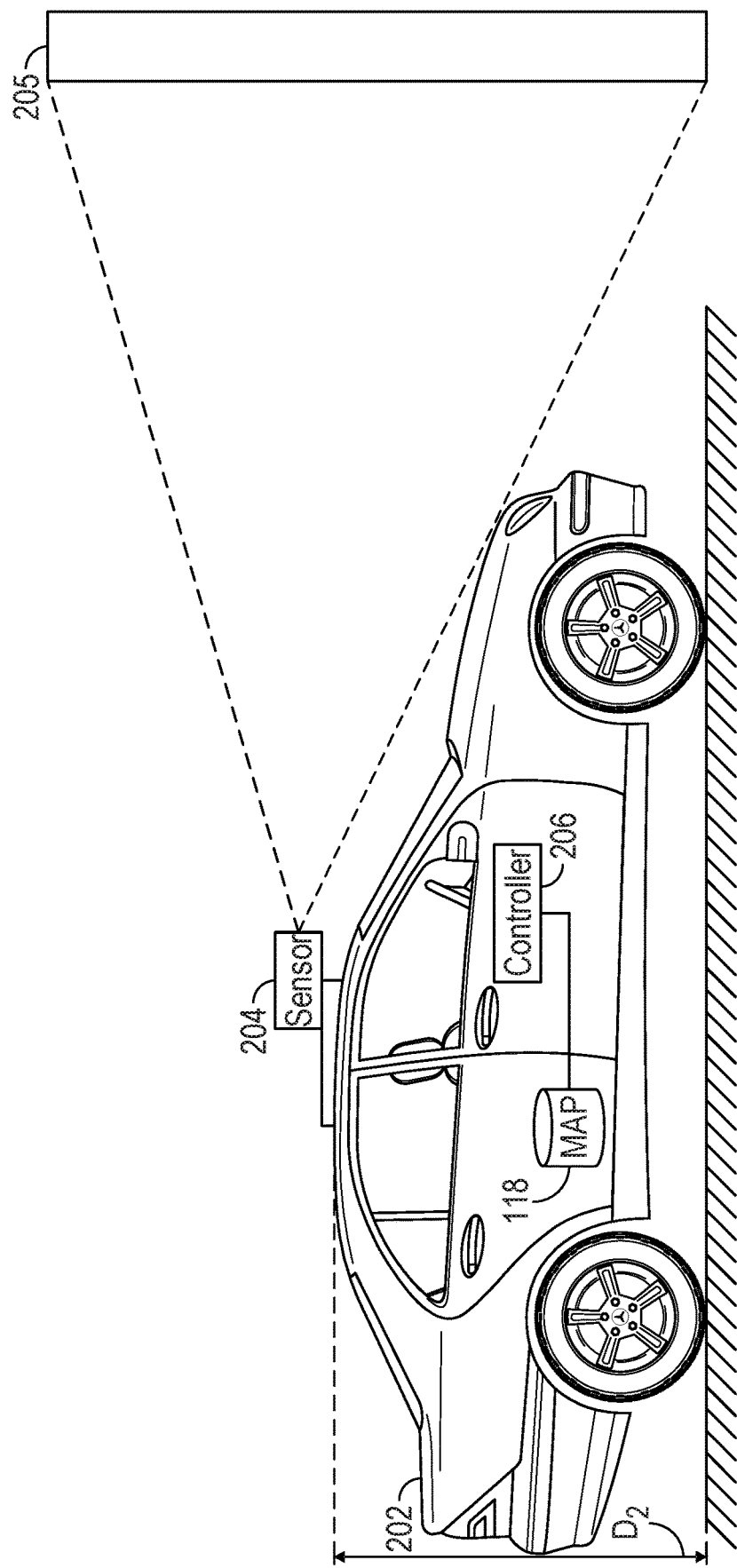
FIG. 2 shows an example embodiment of a map data collection vehicle.

FIG. 2 shows an example embodiment of a map data collection vehicle. The map data collection vehicle 202 includes a sensor 204, a controller 206, and the map database 118. The sensor 204 operationally captures point cloud data representing a scene 205 in front of the vehicle 202. The point cloud data captured by the sensor 204 may include three-dimensional data, such as data across each of X, Y, and Z dimension. The controller 206 stores map data derived from point cloud data collected by the sensor 204 in the map database 118. The map data may reflect a perspective of the sensor 204, which is located at a distance $D_2$ from the ground. Note that distance $D_2$ is a different distance from that of distance $D_1$, discussed above with respect to FIG. 1 and the vehicle 102.

Figure 3A:
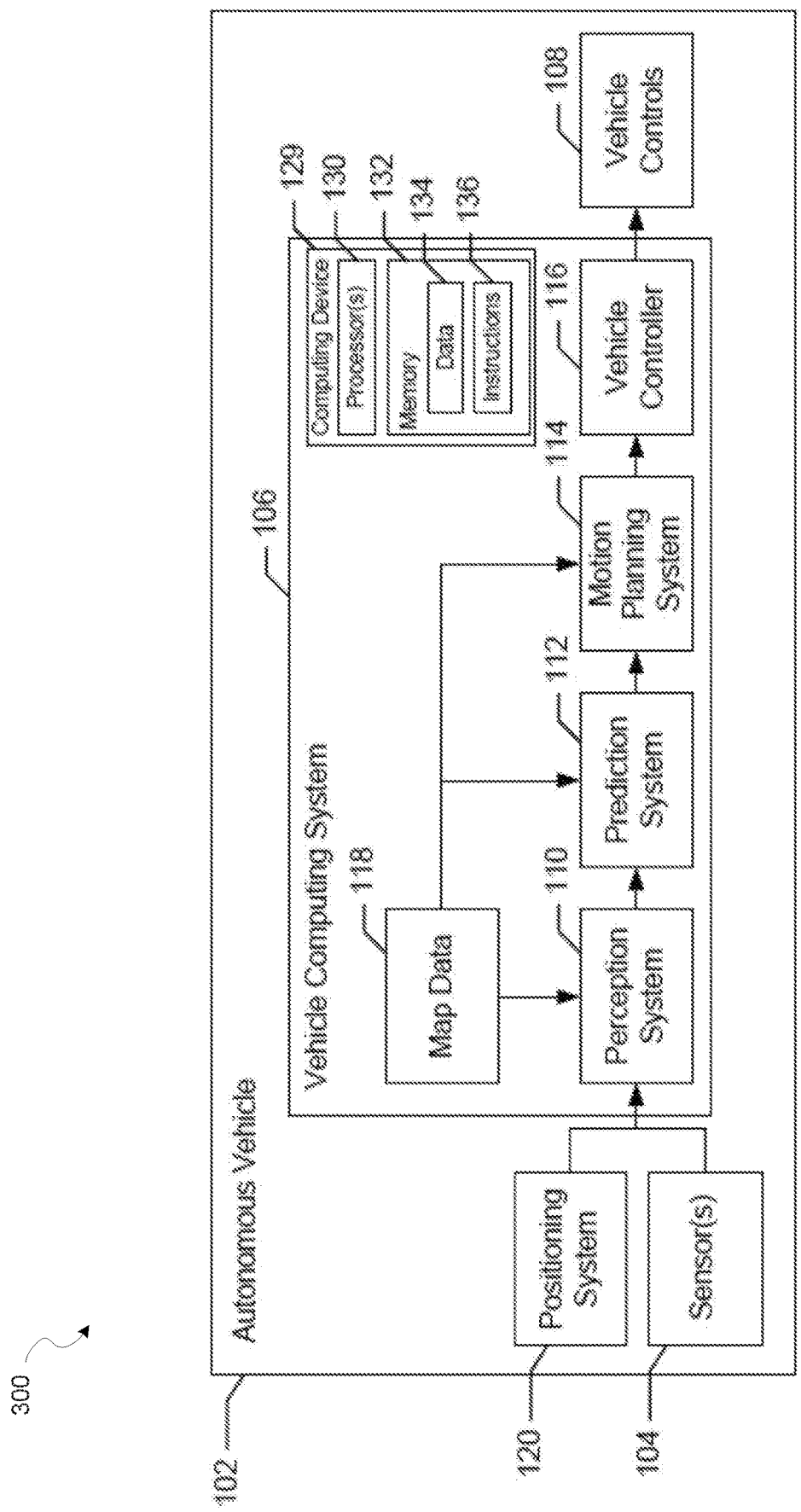
FIG. 3A is a block diagram of an example system to control the navigation of a vehicle according to example embodiments of the present disclosure.

With reference to the figures, example embodiments of the present disclosure will be discussed in further detail. FIG. 3A is a block diagram of an example system 300 to control the navigation of a vehicle 102 according to example embodiments of the present disclosure. The autonomous vehicle 102 is capable of sensing its environment and navigating with little to no human input. The autonomous vehicle 102 can be a ground-based autonomous vehicle (e.g., car, truck, bus, etc.), an air-based autonomous vehicle (e.g., airplane, drone, helicopter, or other aircraft), or other types of vehicles (e.g., watercraft). The autonomous vehicle 102 can be configured to operate in one or more modes, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle.

As discussed above, the autonomous vehicle 102 can include one or more sensors 104, a controller or vehicle computing system 106, and one or more vehicle controls 108. The vehicle controls 108 may include one or more of the vehicle computing system 106 can assist in controlling the autonomous vehicle 102. In particular, the vehicle computing system 106 can receive sensor data from the one or more sensors 104, attempt to comprehend the surrounding environment by performing various processing techniques on data collected by the sensors 104, and generate an appropriate motion path through such surrounding environment. The vehicle computing system 106 can control the one or more vehicle controls 108 to operate the autonomous vehicle 102 according to the motion path.

The vehicle computing system 106 can include one or more processors 130 and at least one memory 132. The one or more processors 130 can be any suitable processing device (e.g., a processor core, a microprocessor, an ASIC, a FPGA, a controller, a microcontroller, etc.) and can be one processor or a plurality of processors that are operatively connected. The memory 132 can include one or more non-transitory computer-readable storage mediums, such as RAM, ROM, EEPROM, EPROM, flash memory devices, magnetic disks, etc., and combinations thereof. The memory 132 can store data 134 and instructions 136 which are executed by the processor 130 to cause vehicle computing system 106 to perform operations. In some implementations, the one or more processors 130 and at least one memory 132 may be comprised in one or more computing devices, such as computing device(s) 129, within the vehicle computing system 106.

In some implementations, vehicle computing system 106 can further be connected to, or include, a positioning system 120. Positioning system 120 can determine a current geographic location of the autonomous vehicle 102. The positioning system 120 can be any device or circuitry for analyzing the position of the autonomous vehicle 102. For example, the positioning system 120 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position. The position of the autonomous vehicle 102 can be used by various systems of the vehicle computing system 106.

As illustrated in FIG. 3A, in some embodiments, the vehicle computing system 106 can include a perception system 110, a prediction system 112, and a motion planning system 114 that cooperate to perceive the surrounding environment of the autonomous vehicle 102 and determine a motion plan to control the motion of the autonomous vehicle 102 accordingly. In some implementations, the vehicle computing system 106 can also include a feature extractor/concatenator 122 and a speed limit context awareness machine-learned model 124 that can be provide data to assist in determining the motion plan to control the motion of the autonomous vehicle 102.

In particular, in some implementations, the perception system 110 can receive sensor data from the one or more sensors 104 that are coupled to or otherwise included within the autonomous vehicle 102. As examples, the one or more sensors 104 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 102.

As one example, for LIDAR systems, the sensor data can include the location (e.g., in three-dimensional space relative to the LIDAR system) of a number of points that correspond to objects that have reflected a ranging laser. For example, LIDAR system can measure distances by measuring the Time of Flight (TOF) that it takes a short laser pulse to travel from the sensor to an object and back, calculating the distance from the known speed of light.

As another example, for RADAR systems, the sensor data can include the location (e.g., in three-dimensional space relative to RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 104 can be used to collect sensor data that includes information that describes the location (e.g., in three-dimensional space relative to the autonomous vehicle 102) of points that correspond to objects within the surrounding environment of the autonomous vehicle 102.

In addition to the sensor data, the perception system 110 can retrieve or otherwise obtain map data 118 that provides detailed information about the surrounding environment of the autonomous vehicle 102. The map data 118 can provide information regarding: the identity and location of different travel ways (e.g., roadways), road segments, buildings, or other items or objects (e.g. lampposts, crosswalks, curbing, etc.); the location and directions of traffic lanes (e.g., the location and direction of a parking lane, a turning lane, a bicycle lane, or other lanes within a particular roadway or other travel way); traffic control data (e.g., the location and instructions of signage, traffic lights, or other traffic control devices); and/or any other map data that provides information that assists the vehicle computing system 106 in comprehending and perceiving its surrounding environment and its relationship thereto.

The perception system 110 can identify one or more objects that are proximate to the autonomous vehicle 102 based on sensor data received from the one or more sensors 104 and/or the map data 118. In particular in some implementations, the perception system 110 can determine, for each object, state data that describes a current state of such object. As examples, the state data for each object can describe an estimate of the object's: current location (also referred to as position); current speed; current heading (also referred to together as velocity); current acceleration; current orientation; size/footprint (e.g., as represented by a bounding shape such as a bounding polygon or polyhedron); class (e.g. vehicle versus pedestrian versus bicycle versus other), yaw rate; and/or other state information.

In some implementations, the perception system 110 may determine state data for each object over a number of iterations. In particular, the perception system 110 can update the state data for each object at each iteration. Thus, the perception system 110 can detect and track objects (e.g., vehicles, pedestrians, bicycles, and the like) that are proximate to the autonomous vehicle 102 over time.

The prediction system 112 may receive the state data from the perception system 110 and predict one or more future locations for each object based on such state data. For example, the prediction system 112 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 114 may determine a motion plan for the autonomous vehicle 102 based at least in part on the predicted one or more future locations for the object provided by the prediction system 112 and/or the state data for the object provided by the perception system 110. Stated differently, given information about the current locations of objects and/or predicted future locations of proximate objects, the motion planning system 114 can determine a motion plan for the autonomous vehicle 102 that best navigates the autonomous vehicle 102 relative to the objects at such locations.

As one example, in some implementations, the motion planning system 114 can determine a cost function for each of one or more candidate motion plans for the autonomous vehicle 102 based at least in part on the current locations and/or predicted future locations of the objects. For example, the cost function can describe a cost (e.g., over time) of adhering to a particular candidate motion plan. For example, the cost described by a cost function can increase when the autonomous vehicle 102 approaches a possible impact with another object and/or deviates from a preferred pathway (e.g., a preapproved pathway).

Thus, given information about the current locations and/or predicted future locations of objects, the motion planning system 114 can determine a cost of adhering to a particular candidate pathway. The motion planning system 114 can select or determine a motion plan for the autonomous vehicle 102 based at least in part on the cost function(s). For example, the candidate motion plan that minimizes the cost function can be selected or otherwise determined. The motion planning system 114 can provide the selected motion plan to a vehicle controller 116 that controls one or more vehicle controls 108 (e.g., actuators or other devices that control gas flow, acceleration, steering, braking, etc.) to execute the selected motion plan.

Figure 3B:
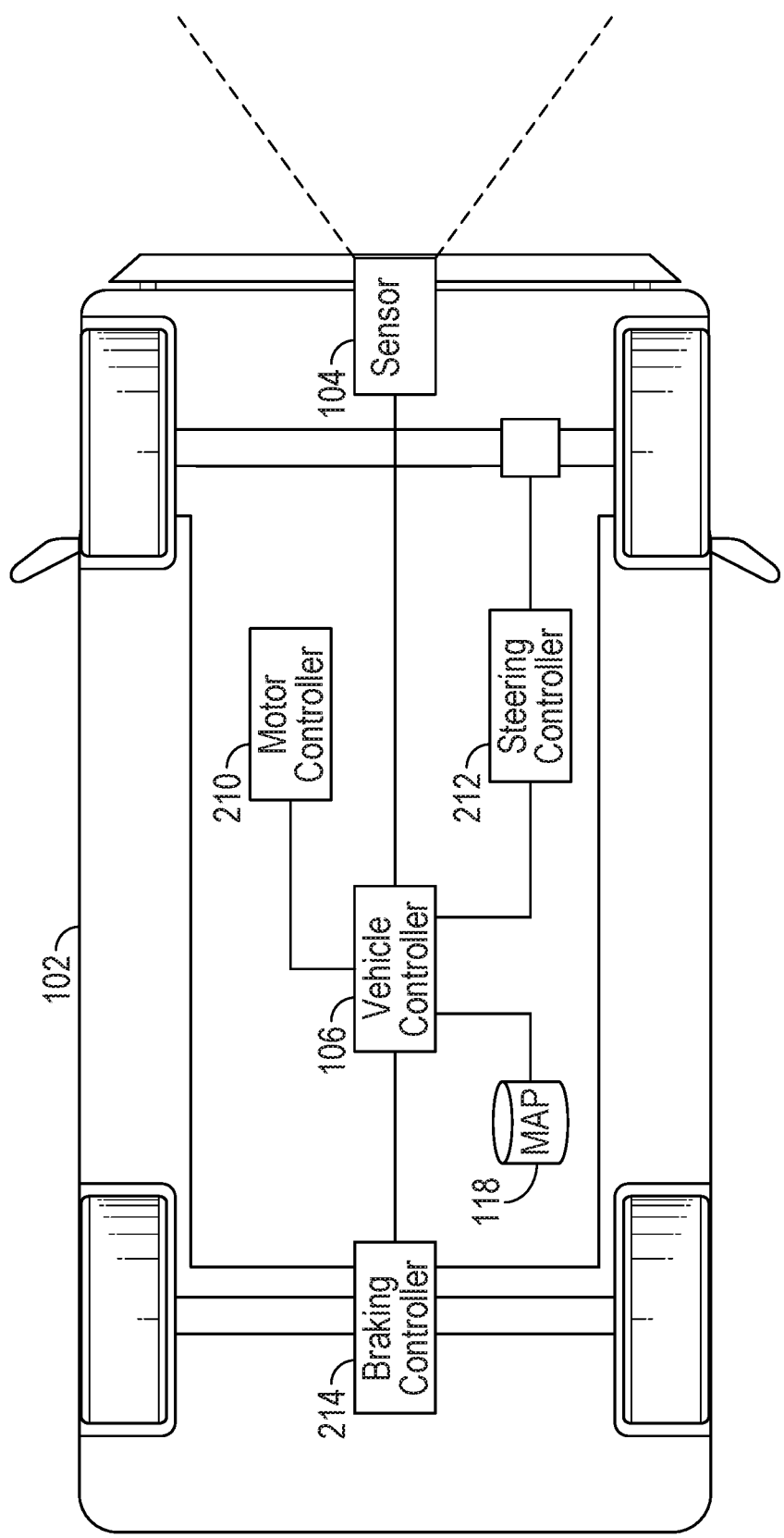
FIG. 3B is an example expanded view of an autonomous vehicle.

FIG. 3B is an example of an expanded view of the autonomous vehicle 102. As discussed above, the autonomous vehicle 102 may include the sensor 104, the vehicle controller or vehicle computing system 106, a motor controller 210, a steering controller 212, a braking controller 214, and the map database 118. The controller 106 is operably connected to each of the sensor 104, motor controller 210, steering controller 212 and braking controller 214, via any known interconnect technology. In FIG. 3, this is illustrated as a bus 230. The vehicle controller 106 may be configured to capture multiple point cloud data sets from the sensor 104 and compare the point cloud data sets to map data in the map database 118. Based on the comparison, the controller 106 may determine a position of the vehicle 102. The vehicle controller 106 may control the position and/or speed of the vehicle 102 by issuing commands to one or more of the motor controller 210, steering controller 212, and/or braking controller 214. For example, if the controller 106 determines a speed of the truck should be increased, the controller 106 may transmit a command to the motor controller 210 indicating an increased level of fuel is to be provided to the motor. In embodiments utilizing electric motors, the vehicle controller 106 may transmit a command to the motor controller 210 indicating an increased current or voltage is to be provided to the motor. If the vehicle controller 106 determines a position of the vehicle 102 should be adjusted to the left or right, the controller 106 may send a command indicating same to the steering controller 212.

Figure 4:
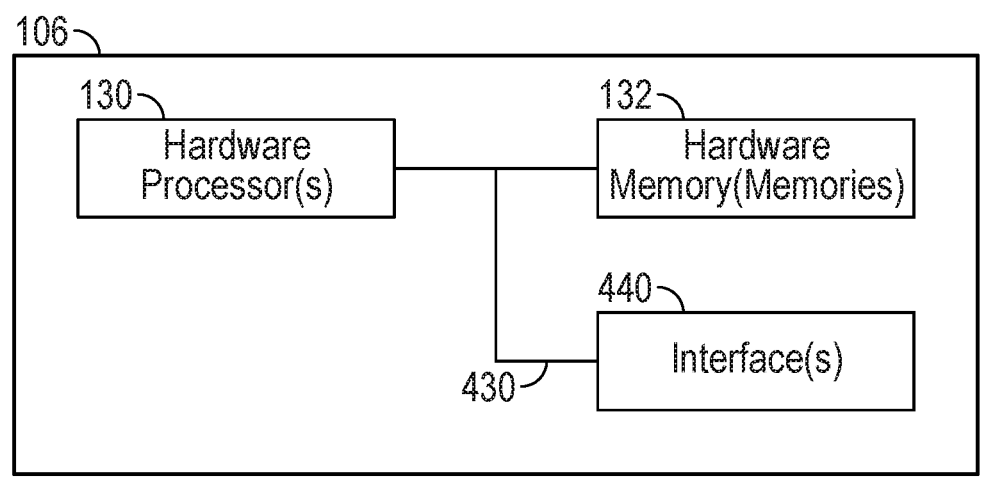
FIG. 4 is an expanded view of an example controller or vehicle computing system.

FIG. 4 is an expanded view of an example controller or vehicle computing system 106. The example controller or vehicle computing system 106 of FIG. 4 includes one or more hardware processors 130, a hardware memory or memories 132, and one or more interfaces 440. The hardware processor(s) 130, memories 132, and interfaces 440 may be operably connected via any known interconnect technology, such as a bus 430. In some aspects, instructions stored in the memory/memories 132 may configure the one or more hardware processors 130 to perform one or more of the functions discussed below to provide for autonomous control of a vehicle, such as the vehicle 102. The interface(s) 440 may provide for electronic communication between the controller 106 and one or more of the motor controller 210, steering controller 212, braking controller 214, sensor 104, and/or map database 118.

Figure 5:
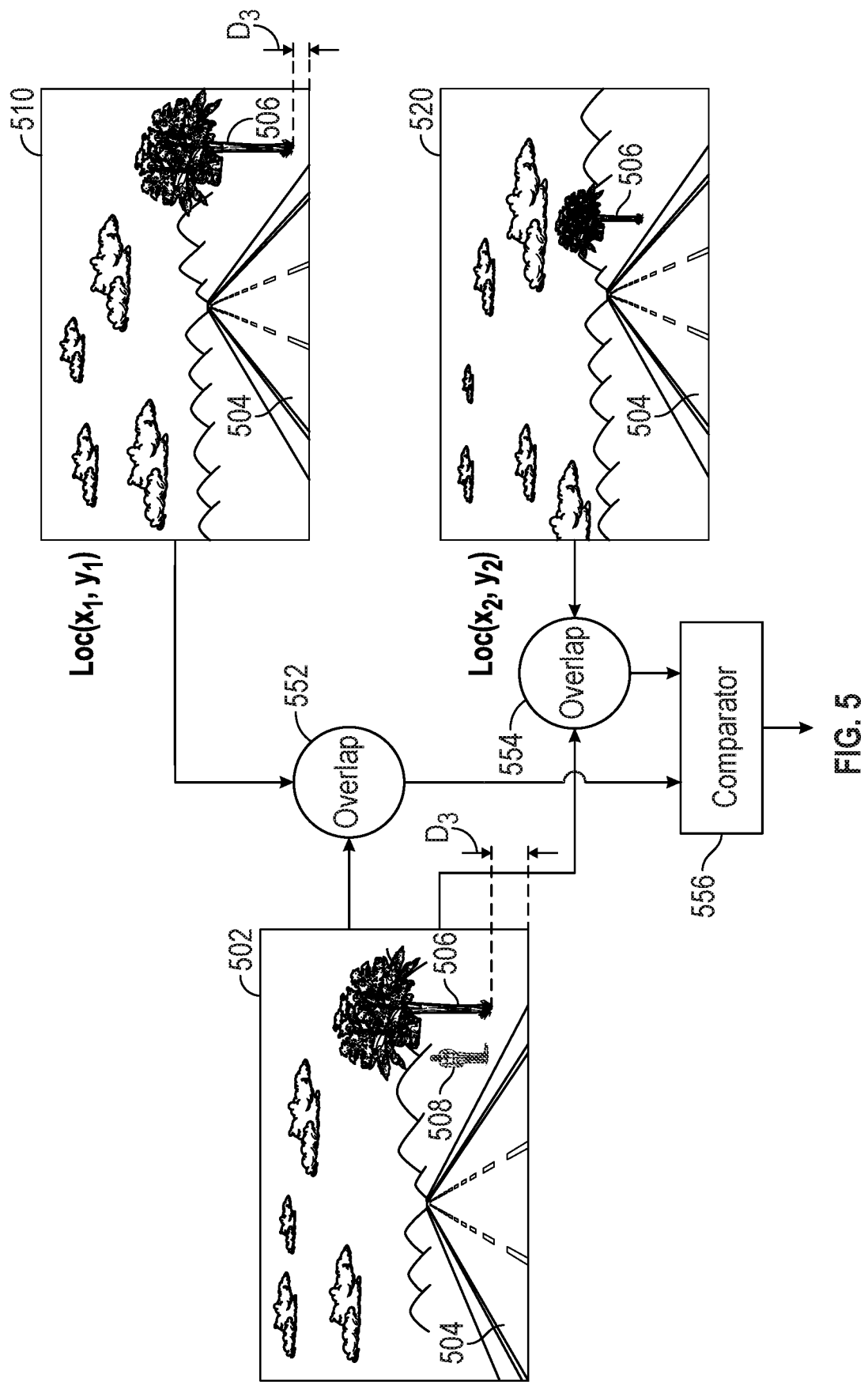
FIG. 5 shows example scenes captured by LIDAR sensor(s) of an autonomous vehicle and a map generating vehicle.

FIG. 5 shows example scenes captured by LIDAR sensors) of an autonomous vehicle and a map generating vehicle. While a LIDAR sensor may capture point cloud data, for ease of illustration the scenes 502, 510, and 520 are shown as two dimensional images. An autonomous vehicle sensor may capture point cloud data for the scene 502. The scene 502 may be captured, in some aspects, by the sensor 104. The scene 502 shows a relatively straight road 504, a tree 506, and a pedestrian 508. The scene 502, shows that the tree 506 is a distance $D_3$ from the LIDAR sensor (e.g. 104) capturing the scene 502.

Point cloud data for a scene 510 may be captured by a vehicle generating map data. For example, point cloud data for the scene 510 may be captured by the sensor 204 of the vehicle 202. The scene 510 also shows the road 504 and the tree 506. The tree 506 in the scene 510 is a distance $D_4$ from the imaging sensor 204. D4 is less than $D_3$ in the scene 502. Thus, the scene 510 may be captured when the vehicle 202 is positioned closer to the tree than the vehicle 102 was positioned when capturing the scene 502.

Point cloud data for the scene 520 may also be captured by a vehicle generating map data. The scene 520 shows the road 504 and the tree 506. The tree 506 in the scene 520 is further from the LIDAR sensor capturing the scene 520 (e.g. a distance $D_{4'}$, not shown) than in either the scene 510 or 502.

Some aspects may generate a first overlap score 552 for point cloud data representing the scenes 502 and 510, and a second overlap score 554 for point cloud data representing scenes 502 and 520. The two overlap scores 552 and 554 may be compared, with results of the comparison used to select a set of point cloud data for a scene that is closest to the scene 502 captured by the autonomous vehicle.

To generate an overlap score, a positional relationship between two scenes may be determined. For example, in some aspects, a "best fit" process may be performed so as to establish a correspondence between point cloud data representing the scene 502 and point cloud data representing the scene 510, and similarly to establish a correspondence between point cloud data representing the scene 502 and point cloud data representing the scene 520.

Figure 6:
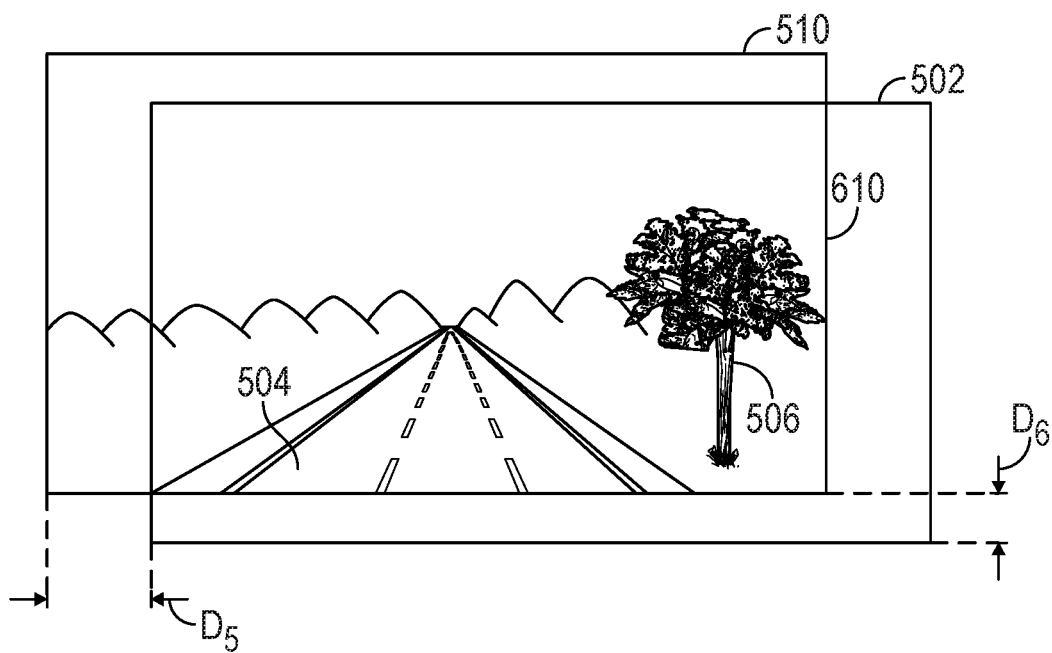
FIG. 6 is a visual representation of a best fit correspondence between two sets of point cloud data representing two scenes respectively.

FIG. 6 is a visual representation of a best fit correspondence between point cloud data 502i and 510i representing the scenes 502 and 510 respectively. As shown in FIG. 6, aligning features in each of the point cloud data sets 502i and 510i may result in offsets in one or more dimensions between the point cloud data sets 502i and 510i. For example, point cloud data 502i is shown, in a simplified two dimensional view, offset to the right and below the point cloud data 510i to obtain the best fit. A size of the offsets in a first and second dimension is shown by $D_5$ and $D_6$ respectively. In some aspects, after the correspondence between point cloud data 502i and point cloud data 510i is established as visually indicated in FIG. 6 (in two dimensions only for ease of illustration), an overlap score may then be determined based on portions of each set of point cloud data representing a shared three-dimensional space. The shared three-dimensional space is established based on the correspondence. In some aspects, correspondence between two sets of point cloud data establishes coordinate offsets between points in each of the point clouds that represent a common point in three-dimensional space. For example, if the point cloud data 502i is offset to the right relative to point cloud data 510i by ten (10) pixels, the correspondence in the horizontal dimension will indicate that data at a position (x, y, z) in point cloud data 502i is to be compared to data at position (x+10,y,z) in point cloud data 510i.

In some aspects, after the correspondence illustrated in FIG. 6 is established, the portion of three-dimensional space that is shared by the two sets of point cloud data is illustrated as region 610. An overlap score for region 610 of the two point clouds may then be determined in some aspects.

Figure 7:
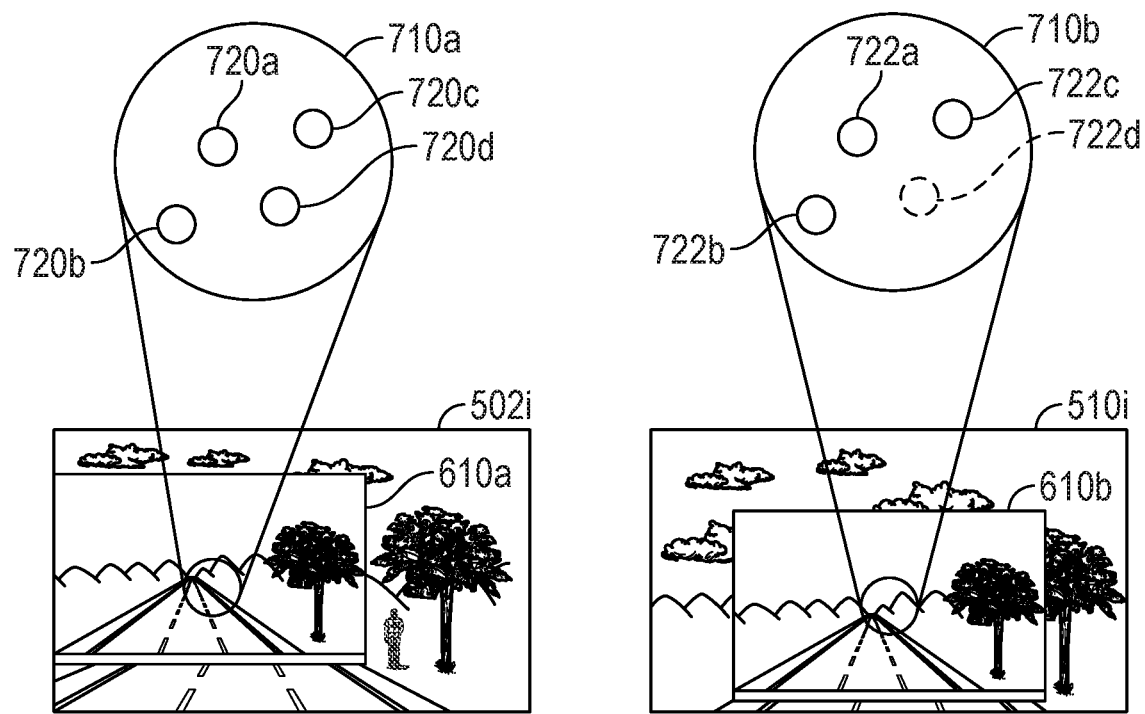
FIG. 7 shows the two sets of point cloud data.

FIG. 7 shows the two sets of point cloud data 502i and 510i. Point cloud data 502i represents the scene 502 of FIG. 5 in three dimensions (only two dimensions shown in FIG. 7), while point cloud data 510i represents scene 510 of FIG. 5 in three dimensions (only two dimensions shown in FIG. 7). Regions 610a and 610b are shown within each of point cloud data 502i and 510i. These regions 610a-b represent the region 610 shown in FIG. 6, but contained within each of the respective point cloud data 502i and 510i.

Magnified views of portions of regions 610a and 610h are shown as 710a and 710b respectively. Portion 710a includes four points 720a-d while portion 710b includes three points 722a-c. The portions 710a-b are shown in two dimensions for ease of illustration, but the portions shown are intended to represent point cloud data in a three-dimensional space. A location within portion 710b corresponding to point 720d in region 610a is shown as 722d. The two points 720d and 722d may be considered corresponding or "matching" because they have equivalent coordinates in their respective images or point clouds after the images or point clouds are aligned, for example, via a registration process. In some aspects, if the two points have coordinates within a predetermined range of each other, they may also be considered corresponding. The predetermined range may be provided to allow for some error in alignment of point clouds. For example, in some of the disclosed embodiments, the predetermined range may represent a relatively small distance error in the alignment, such as less than any of 20, 19, 18, 17, 16, 15, 14, 13, 12, 11, 10, 9, 8, 7, 6, 5, 4, 2, or 1 centimeters. In some embodiments, an overlap score may relate a number of matching points to a total number of points. Thus, in the simplified example of FIG. 7, some embodiments would determine an overlap score of 0.75 for the two portions 710a and 710b. This approach may be extended to encompass the entirety of regions 610a-b and/or point cloud data 502i and 510i.

FIG. 8 shows example two dimensional representations of point cloud data used to determine an overlap score. The point cloud data 802 may be captured from an autonomous vehicle and compared to map data including the point cloud data 810. The point cloud data 802 shows a road 820, bridge 822, and building 824. The map point cloud data 810 also includes the road 820, bridge 822, and building 824. The map point cloud data 810 differs from the vehicle point cloud data 802 in that a portion of the building 826 is visible above the bridge 822 in the vehicle point cloud data 802 but not in the map point cloud data 810. In some aspects, this difference may be caused by a difference in height of the two LIDAR sensors that captured the two sets of point cloud data 802 and 810. For example, as shown in FIGS. 1 and 2, the sensor 104, mounted on a roof of the vehicle 102, and used to capture point cloud data 802, may be further from the ground (i.e. distance $D_1$) than the sensor 204, mounted on a roof of the car 202 (i.e. distance D2) and used to capture map point cloud data 810. An overlap score based on the point cloud data 802 and 810 may be reduced due to the difference in perspective caused by the different distances D1 and D2, and the resulting building portion 826 appearing in point cloud 802 but not in point cloud data 810.

Aspects disclosed may determine whether a portion of a three-dimensional space including the building portion 826 in point cloud data 802 was obscured in point cloud data 810. In some aspects, this determination may be performed in response to determining that the portion 826 in point cloud data 802 is not present in point cloud data 810. In some aspects, if any portion of three-dimensional space including the building portion 826 was obscured in point cloud data 810, that portion may not be included in an overlap score based on the point cloud data 802 and point cloud data 810. For example, if an obscured portion of the space occupied by building portion 826 included a particular number of data points, those particular number of data points would not be included in the overlap score, in that a total number of points would not include the particular number of points.

FIG. 9 illustrates tracing of a ray from a laser source to a destination. FIG. 9 shows the scene 502. Point cloud data representing the scene 502 may be captured by an autonomous vehicle, such as the autonomous vehicle 102 discussed above with respect to at least FIGS. 1 and 3. FIG. 9 also shows one embodiment of map data 910. The map data 910 may include point cloud data captured by a map data collection vehicle, such as the map data collection vehicle 202 discussed above with respect to FIG. 2. The map data 910 may not include the tree 506 or the pedestrian 508.

As discussed above, point cloud data representing the scene 502 may be compared to point cloud data representing the scene 910 when determining a position of an autonomous vehicle in at least some of the disclosed embodiments. The comparison of the two point cloud data sets may identify points representing the tree 506 in scene 502 that do not have corresponding points in the point cloud representing the scene 510, since the tree 506 is not present in the scene 506. These points may be considered non-matching points. In other words, corresponding or "matching" points may be two points in two respective point cloud data sets that have equivalent coordinates after the two point cloud data sets are aligned, for example, via a registration process. In some aspects, some degree of error may be provided for in determining whether two points are corresponding. For example, in some aspects, two points may be considered corresponding if they are within a first predetermined number of units in a first axis (such as an X axis), a second predetermined number of units in a second axis (such as a Y axis), and a third predetermined number of units in a third axis (such as a Z axis).

In some aspects, to determine whether each point representing the tree in scene 502 should be included in an overlap score between the two scenes 502 and 910, ray tracing data may be generated for the point cloud data representing the scene 910. The ray tracing data may be used to determine if a point exists in the scene 910's point cloud data at any position along the path of the ray (e.g. ray 920 in FIG. 9). A source of the ray may be a laser source position of a LIDAR sensor capturing the scene 910. The ray may intersect a location in the scene 910 occupied by a non-matching point in the point cloud data for scene 502. The ray may also extend beyond the non-matching point. If the ray intersects a point in the point cloud data representing the scene 910, then the non-matching point in the scene 502 may be included in an overlap score. If the ray does not intersect any point in the point cloud data representing the scene 910, in some embodiments, the non-matching point may not be included in the overlap score.

Figure 10:
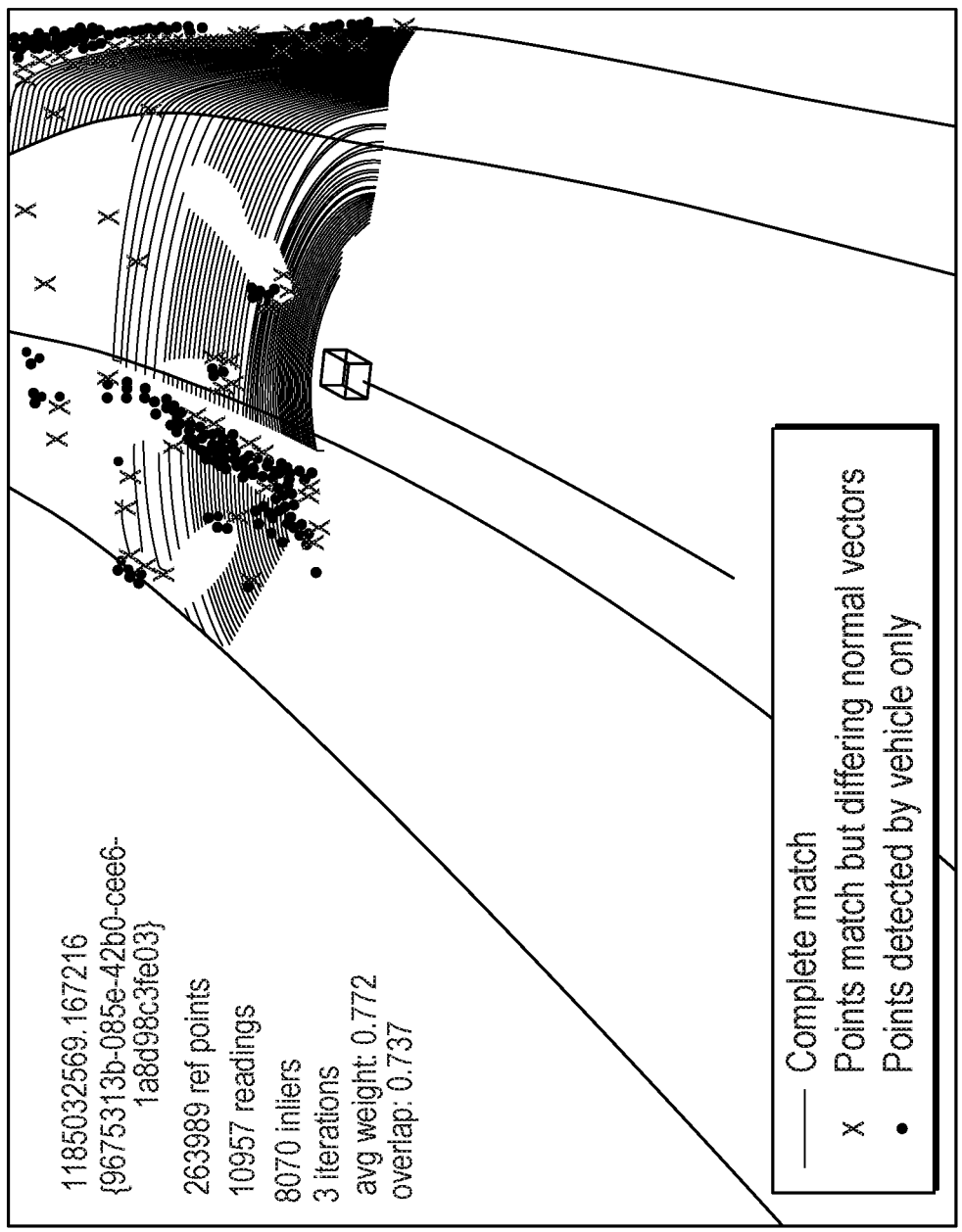
FIG. 10 is an example of a comparison of point cloud data captured by an autonomous vehicle and data included in a map.

FIG. 10 is an example of a comparison of point cloud data captured by an autonomous vehicle (e.g. 102) and data included in a map. FIG. 10 illustrates that with some points, both a normal vector associated with a point and the point itself match. For some additional portion of points, locations of the points match between the two data but the normal vectors are different. This may occur, for example, with foliage, which may be repositioned frequently by wind or even in some aspects by passing vehicles. For some other points, there may not be a point in the map data at a location of a point in the vehicle's point cloud.

Figure 11:
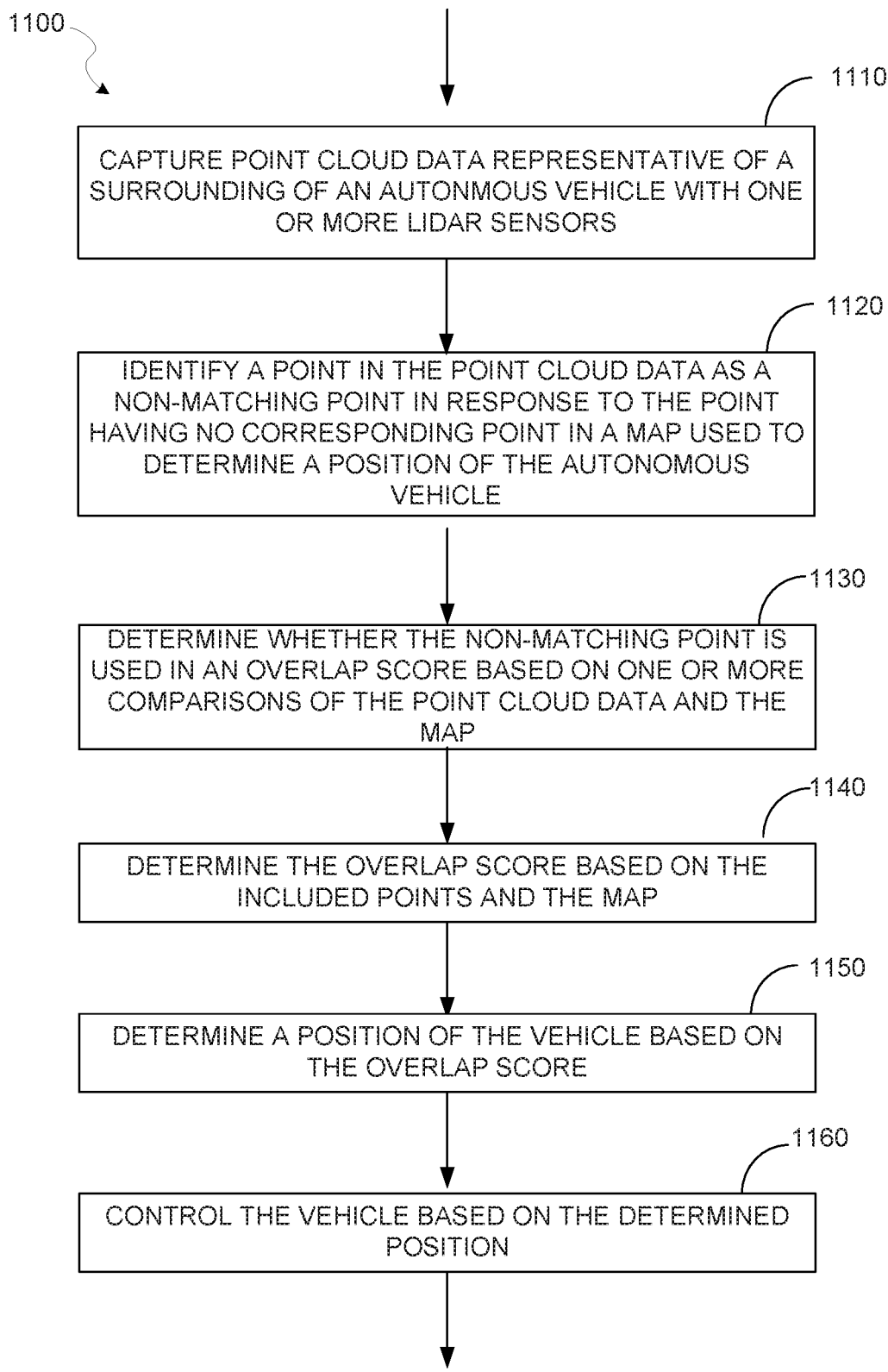
FIG. 11 is a flowchart of an example method of controlling an autonomous vehicle.

FIG. 11 is a flowchart of an example method of controlling an autonomous vehicle. The process 1100 discussed below with respect to FIG. 11 may be performed, in some aspects, by the vehicle controller 106. For example, instructions stored in the memory 132 may configure the one or more hardware processors 130 to perform one or more of the functions discussed below with respect to FIG. 11 and process 1100.

Process 1100 determines an overlap score. The overlap score indicates an amount of overlap between position data collected by a first vehicle, for example, from a LIDAR sensor, and map data. The map data may be generated prior to performance of the process 1100. The map data may be based on data obtained from a separate sensor mounted on a different second vehicle. As discussed above, differences in height between the first sensor and the second sensor may result in reduced overlap between the vehicle data and the map data. In some aspects, this may have deleterious effects if not properly compensated.

In block 1110, a point cloud is captured with a LIDAR sensor. For example, in some aspects, point cloud data representing the scene 105 may be captured by the sensor 104. The point cloud data is representative of a surrounding of an autonomous vehicle. For example, as discussed above with respect to FIG. 1, the sensor 104 may capture the scene 105 immediately in front of the vehicle 102.

In block 1120, a point is identified in the point cloud data as a non-matching point in response to the point having no corresponding point in a map. The map may also include three-dimensional data or point cloud data. The three-dimensional space represented by each of the point cloud data and the map is compared. In some aspects, at least a portion of points in the captured point cloud data will match a point in the map data. Another portion of points may not have a corresponding matching point in the map. For example, if a point in the point cloud data represents a reflection of LIDAR signals from an object at a location in the point cloud, the corresponding location in the map may be empty, or in other words, may not indicate a reflection of LIDAR data.

Corresponding or "matching" points may be two points in the captured point cloud data and the map data respectively that have equivalent coordinates after the two point cloud data sets are aligned, for example, via a registration process. In some aspects, some degree of error may be provided for in determining whether the two points are corresponding or matching. For example, in some aspects, two points may be considered corresponding if they are within a first predetermined number of units in a first axis (such as an X axis), a second predetermined number of units in a second axis (such as a Y axis), and a third predetermined number of units in a third axis (such as a Z axis). In some aspects, if the two points have coordinates within a predetermined range of each other, they may also be considered corresponding. The predetermined range may be provided to allow for some error in alignment of point clouds. For example, in some of the disclosed embodiments, the predetermined range may represent a relatively small absolute distance error in the alignment, such as less than any of 20, 19, 18, 17, 16, 15, 14, 13, 12, 11, 10, 9, 8, 7, 6, 5, 4, 2, or 1 centimeters.

In some aspects, a height parameter for the map may be determined. For example, some aspects may store information relating to distance $D_2$ with the map generated by the vehicle 202. The height parameter may be compared to a height of the one or more Lidar sensors used to capture the point cloud in block 1110 (e.g. $D_1$). The point-cloud data may be adjusted based on the comparison.

In some aspects, an angle of the one or more LIDAR sensors with respect to a reference plane may be determined, and compared with an angle associated with the map data. The point-cloud data based on the angle in some aspects. After one or more of the adjustments, the determination of whether the point is a matching point or a non-matching point may be made.

In block 1130, a determination is made as to whether the non-matching point is used in an overlap score. The determination is based on one or more comparisons of the point cloud data and the map. For example, in some aspects, in some aspects, block 1130 may determine whether the corresponding position in the map is obscured in the map data. As discussed above, in some aspects, because of differences in perspective between a LIDAR sensor used to capture the map data, and a LIDAR sensor used to capture point cloud data for an autonomous vehicle, some objects visible to the LIDAR sensor(s) of the autonomous vehicle may not be visible to the LIDAR sensor collecting data for the map.

Some aspects may generate ray-tracing data representing a tracing of a ray from a laser source of the one or more Lidar sensors to a location in the map corresponding to the location of the non-matching point. If a point is at the location in the map, the non-matching point may be included in the determination of the overlap sore. If there is no point at the location in the map, the non-matching point may not be included in the determination of the overlap score.

Some aspects may determine whether the non-matching point corresponds to a non-occluded point of the map; and include the non-matching point in the determination of the overlap score in response to the non-matching point corresponding to a non-occluded point. For example, as discussed in FIG. 8, some objects, such as the building 826, may be represented by the point cloud data representing a scene captured by an autonomous vehicle, but may be obscured in point cloud data of the map. In these cases, non-matching points may not be considered in an overlap score.

In block 1140, the overlap score is determined based on the included points and the map. The overlap score relates a number of point that map to the map to a total number of points included in the determination of the overlap score.

In block 1150, a position of the vehicle is determined based on the overlap score. For example, as discussed above, an overlap score may be determined for a plurality of map point cloud data sets. A set of point cloud data in the map having the highest overlap score with vehicle point cloud data may be selected as most closely approximating the vehicle position. Offsets from the selected map point cloud data may then be determined to determine a more precise position of the vehicle relative to the selected map point cloud data.

In block 1160, the vehicle is controlled based on the determined position. For example, as discussed above, the controller 106 may send a command to one or more of the motor controller 210, steering controller 212, and braking controller 214 to control the vehicle based on the determined position. For example, if the determined position indicates the vehicle is not centered in a lane of travel, the controller 214 may send a command to the steering controller 212 to adjust the path of the vehicle to move the vehicle closer to the center of the lane. As another example, if the determined position is within a predetermined threshold distance of a curve in a road, the controller 106 may send a command to the braking controller 214 and/or motor controller 210 to reduce a speed of the vehicle.

In some aspects, process 1100 includes determining a motion plan for the autonomous vehicle. The motion plan may be based in some aspects on the overlap score. Process 1100 may include sending a signal to one or more of a steering controller, engine controller, or braking controller based on the motion plan.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017, Uber, Inc., All Rights Reserved.

I claim:

1. A method of controlling a vehicle, comprising:
capturing, via hardware processing circuitry, point-cloud data representative of a surrounding environment of an autonomous vehicle with one or more LIDAR sensors, each point in the point-cloud data representing a reflection from the surrounding environment;
identifying, via the hardware processing circuitry, a first point in the point cloud data as a non-matching point based at least on the first point having no corresponding point in a map;
selectively including, via the hardware processing circuitry, the non-matching first point in a set of points based on one or more comparisons of the point cloud data and the map;
determining, via the hardware processing circuitry, a first overlap score by relating a number of points in the set of points that have corresponding matching points on the map to a total number of points in the set of points, wherein determining the first overlap score comprises determining, based on a plurality of candidate positions of the autonomous vehicle within the map, a plurality of overlap scores including the first overlap score; and
determining a position of the autonomous vehicle on the map based on the first overlap score and the map, wherein determining the position of the autonomous vehicle comprises comparing the plurality of overlap scores to determine the position of the autonomous vehicle; and
controlling, via the hardware processing circuitry, the autonomous vehicle based on the position.

2. The method of claim 1, wherein the selectively including the non-matching first point in the set of points comprises:
generating ray-tracing data representing a tracing of a ray from a laser source of the one or more LIDAR sensors through the non-matching first point;
determining that the ray intersects a reference point in the map; and
in response to determining that the ray intersects the reference point in the map, including the non-matching first point in the set of points.

3. The method of claim 1, wherein the selectively including the non-matching first point in the set of points comprises:
determining that the non-matching first point corresponds to a non-occluded point of the map; and
including the non-matching first point in the set of points in response to the non-matching first point corresponding to a non-occluded point.

4. The method of claim 1, further comprising:
determining a height of the one or more LIDAR sensors; and
adjusting the point-cloud data based on the height,
wherein the selective inclusion of the non-matching first point in the set of points is based on the adjusted point cloud data.

5. The method of claim 4, further comprising:
determining a height parameter of the map;
comparing the height parameter to the height of the one or more LIDAR sensors; and
adjusting the point-cloud data based on the comparison.

6. The method of claim 4, further comprising:
determining an angle of the one or more LIDAR sensors with respect to a reference plane; and
adjusting the point-cloud data based on the angle.

7. The method of claim 1, wherein controlling the autonomous vehicle based on the position comprises:
  determining a motion plan for the autonomous vehicle; and
  sending a signal to one or more of a steering controller, engine controller, or braking controller based on the motion plan.

8. A vehicle, comprising:
  one or more light detection and ranging (LIDAR) sensors;
  one or more hardware processors;
  one or more tangible, non-transitory, computer readable media that collectively store instructions that when executed by the one or more hardware processors cause the one or more hardware processors to perform operations, the operations comprising:
  capturing point-cloud data representative of a surrounding of the vehicle, each point in the point-cloud data representing a reflection from the surrounding environment;
  identifying a first point in the point cloud data as a non-matching point based at least on the first point having no corresponding point in a map;
  selectively including the non-matching first point in a set of points based on one or more comparisons of the point cloud data and the map;
  determining a first overlap score by relating a number of points in the set of points that have corresponding matching points on the map to a total number of points in the set of points, wherein determining the first overlap score comprises determining, based on a plurality of candidate positions of the autonomous vehicle within the map, a plurality of overlap scores including the first overlap score;
  determining a position of the autonomous vehicle on the map based on the first overlap score and the map, wherein determining the position of the autonomous vehicle comprises comparing the plurality of overlap scores to determine the position of the autonomous vehicle; and
  controlling the autonomous vehicle based on the position.

9. The vehicle of claim 8, wherein selectively including the non-matching first point in the set of points comprises:
  generating ray-tracing data representing a tracing of a ray from a laser source of the one or more LIDAR sensors to a destination point that intersects the non-matching point;
  determining that the ray intersects a reference point in the map; and
  in response to determining that the ray intersects the reference point in the map, including the non-matching point in the set of points.

10. The vehicle of claim 8, wherein selectively including the non-matching first point in the set of points comprises:
  determining that the non-matching point corresponds to a non-occluded point of the map; and
  including the non-matching point in the set of points in response to the non-matching point corresponding to a non-occluded point.

11. The vehicle of claim 8, the operations further comprising:
  determining a height of the one or more LIDAR sensors; and
  adjusting the point-cloud data based on the height, wherein the selective inclusion of the non-matching point in the set of points is based on the adjusted point cloud data.

12. The vehicle of claim 11, the operations further comprising:
  determining a height parameter of the map;
  comparing the height parameter to the height of the one or more LIDAR sensors; and
  adjusting the point-cloud data based on the comparison.

13. The vehicle of claim 11, the operations further comprising:
  determining an angle of the one or more LIDAR sensors with respect to a reference plane; and
  adjusting the point-cloud data based on the angle.

14. The vehicle of claim 8, wherein controlling the autonomous vehicle based on the position comprises:
  determining a motion plan for the autonomous vehicle; and
  sending a signal to one or more of a steering controller, engine controller, or braking controller based on the motion plan.

15. A computing system for a vehicle, comprising:
  one or more hardware processors;
  one or more tangible, non-transitory, computer readable media that collectively store instructions that when executed by the one or more hardware processors cause the one or more hardware processors to perform operations, the operations comprising:
  capturing point-cloud data representative of a surrounding of the vehicle with one or more LIDAR sensors, each point in the point-cloud data representing a reflection from the surrounding environment;
  identifying a first point in the point cloud data as a non-matching point based at least on the first point having no corresponding point in a map;
  selectively including the non-matching first point in a set of points based on one or more comparisons of the point cloud data and the map;
  determining a first overlap score by relating a number of points in the set of points that have corresponding matching points on the map to a total number of points in the set of points, wherein determining the first overlap score comprises determining, based on a plurality of candidate positions of the autonomous vehicle within the map, a plurality of overlap scores including the first overlap score;
  determining a position of the autonomous vehicle on the map based on the first overlap score and the map, wherein determining the position of the autonomous vehicle comprises comparing the plurality of overlap scores to determine the position of the autonomous vehicle; and
  controlling the autonomous vehicle based on the position.

16. The computing system of claim 15, wherein the selective including of the non-matching first point in the set of points comprises:
  generating ray-tracing data representing a tracing of a ray from a laser source of the one or more LIDAR sensors to a destination point that intersects the non-matching point;
  determining that the ray intersects a reference point in the map; and
  in response to determining that the ray intersects the reference point in the map, including the non-matching point in the set of points.

17. The computing system of claim 15, wherein selectively including the non-matching first point in the set of points comprises:
  determining that the non-matching point corresponds to a non-occluded point of the map; and including the non-matching point in the set of points in response to the non-matching point corresponding to a non-occluded point.

18. The method of claim 1, wherein the selective including includes the first non-matching point in the set of points, the method further comprising:
   determining a second non-matching point in the point cloud data that has no corresponding point in the map;
   tracing a ray from a laser source of the one or more LIDAR sensors through the second non-matching point in response to the determination;
   determining that the ray does not intersect a reference point in the map; and
   in response to determining that the ray does not intersect the reference point in the map, inhibiting inclusion of the second non-matching point in the set of points.

19. The method of claim 18, further comprising determining a total number of points in the set of points that counts the first non-matching point and does not count the second non-matching point, determining a total number of matching points in the set of points that does not count the first non-matching point and does not count the second non-matching point, wherein the determining of the first overlap score divides the total number of matching points in the set of points by the total number of points in the set of points.

* * * * *

UNITED STATES PATENT AND TRADEMARK OFFICE
CERTIFICATE OF CORRECTION

PATENT NO.         : 10,684,372 B2                                              Page 1 of 1
APPLICATION NO.    : 15/853448
DATED              : June 16, 2020
INVENTOR(S)        : Kenneth James Jensen It is certified that error appears in the above-identified patent and that said Letters Patent is hereby corrected as shown below:

In the Claims

In Column 14, Line 5, in Claim 1, delete "LI DAR" and insert --LIDAR-- therefor

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*